United States Patent
Maday

[11] Patent Number: 5,913,655
[45] Date of Patent: Jun. 22, 1999

[54] AUTOMATIC DEPALLETIZING SYSTEM AND METHOD

[75] Inventor: Raymond C. Maday, Gravette, Ark.

[73] Assignee: Industrial Innovations, Inc., Gravette, Ark.

[21] Appl. No.: 08/784,770

[22] Filed: Jan. 16, 1997

Related U.S. Application Data

[60] Provisional application No. 60/010,116, Jan. 17, 1996.

[51] Int. Cl.$^6$ ............................................. B65G 1/16
[52] U.S. Cl. .............................. 414/797.2; 414/796.9; 198/861.4; 198/592
[58] Field of Search ............................. 198/592, 861.2, 198/861.3, 861.4; 414/794.5, 796.9, 797.2, 786

[56] References Cited

U.S. PATENT DOCUMENTS

| | | | |
|---|---|---|---|
| 2,613,800 | 10/1952 | Merck | 198/861.2 |
| 2,856,061 | 10/1958 | Seigle et al. | 198/861.2 |
| 3,401,811 | 9/1968 | Grasvoll . | |
| 3,419,266 | 12/1968 | Martin | 414/794.5 |
| 3,463,330 | 8/1969 | Roberts | 414/794.5 |
| 3,682,331 | 8/1972 | Fetherston | 198/592 |
| 3,722,477 | 3/1973 | Weldy et al. | 198/861.2 |
| 3,837,510 | 9/1974 | McWilliams | 214/152 |
| 3,904,024 | 9/1975 | Smith | 198/119 |
| 3,938,674 | 2/1976 | Kroeze et al. | 414/794.5 |
| 4,279,555 | 7/1981 | Rydell | 414/83 |
| 5,090,550 | 2/1992 | Axmann | 198/861.3 |
| 5,096,367 | 3/1992 | Winski | 414/786 |
| 5,108,255 | 4/1992 | Cornacchia | 414/792.8 |
| 5,325,953 | 7/1994 | Doster et al. | 198/592 |
| 5,487,638 | 1/1996 | Salsburg et al. | 414/796.9 |

Primary Examiner—Karen M. Young
Assistant Examiner—Douglas Hess
Attorney, Agent, or Firm—Head, Johnson & Kachigian

[57] ABSTRACT

An automatic system for depalletizing or destacking items, containers or crates. The automatic depalletizing system includes an electronically controlled, automated, lift conveyor having a specialized pick mechanism at its free end, and having a self-contained hydraulic power supply system. The conveyor sequentially lifts pre-stacked crates, containers or items and places them in a single-file on a rotating conveyor automatically (hands free operation or individually controlled). Crates, containers, or items are automatically destacked or depalletized by placing the free end of the depalletizing conveyor in its uppermost position, pushing a dolly having a number of crates stacked thereon adjacent the free end of the depalletizing conveyor, pressing the cycle start button to activate the depalletizing conveyor and pick mechanism, the pick mechanism retrieves the uppermost crate and pulls it onto the upper end of the depalletizing conveyor and thereafter indexes downwardly to a position adjacent the second item from the top of the stack. This sequential removal of the crates from the stack continues until the lowermost crate is removed. When the last crate has been transferred to the conveyor, a lower limit switch is energized which causes an up solenoid valve to move the free end of the conveyor upwardly until the uppermost ready position has been reached and immediately stops belt rotation.

12 Claims, 12 Drawing Sheets

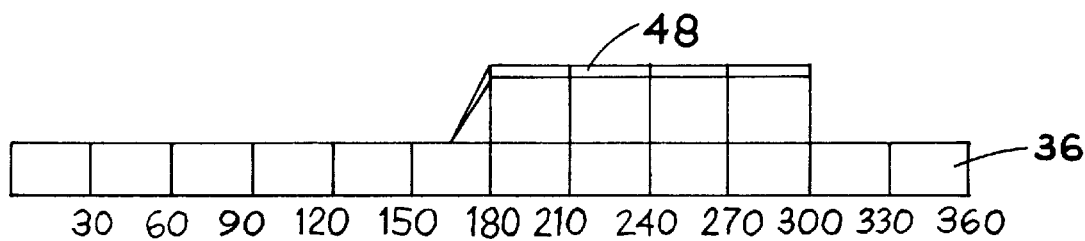
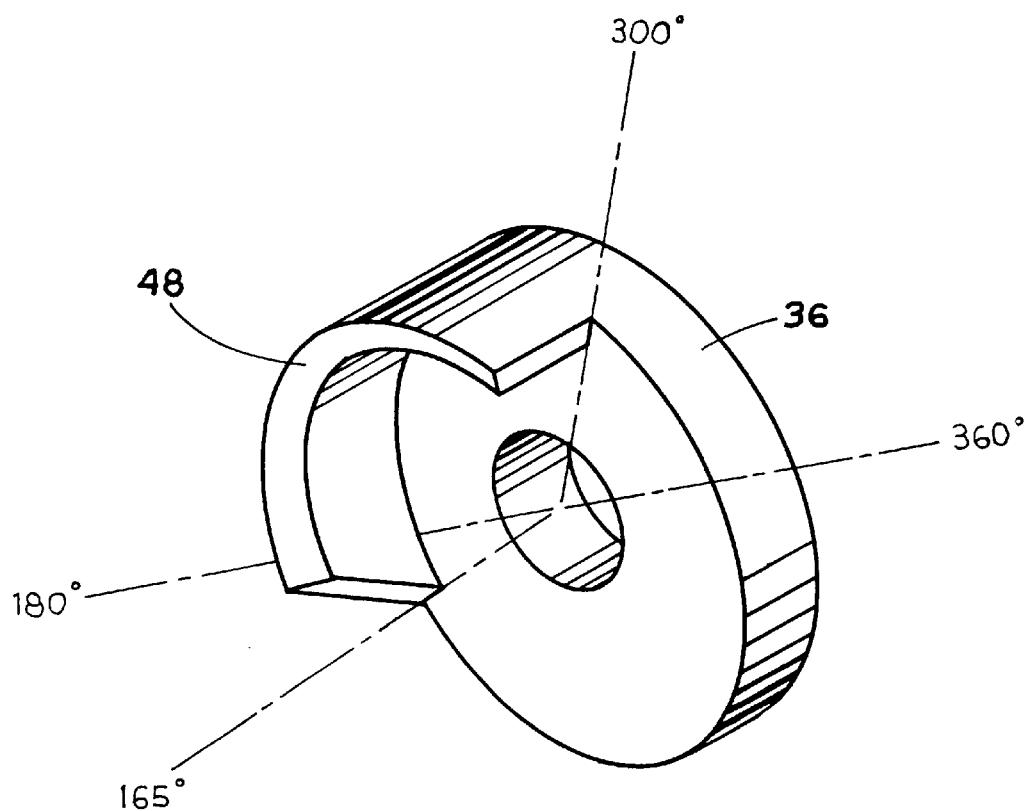
FIG. 8

AUTOMATIC DEPALLETIZING SYSTEM AND METHOD

CROSS-REFERENCE TO RELATED APPLICATIONS

This application is a continuation-in-part of provisional application Ser. No. 60/010,116, filed Jan. 17, 1996.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention is directed to an apparatus and method for sequentially removing items from a stack of items, and more particularly concerns an automatic depalletizing system, apparatus, conveyor, machine or method for automatically sequentially removing one or more crates or containers from a vertical stack of crates or containers.

Conventional poultry industry production methods and movement of processed chicken in poultry processing plants involves the placement of processed packaged poultry products in plastic containers or crates at various work stations. These containers or crates are then stacked seven to eight high on a dolly for ease of in-house movement within the poultry processing plant. All the product in the containers on the dollies is cooled to a temperature of about 28° and then moved to a cold storage unit prior to shipment in refrigerated trucks. This cold temperature is maintained during movement from cold storage to the shipping trucks.

Daily shipping orders are placed prior to start-up operations in shipping. The pack-out personnel stage this product next to the pack-out line conveyors in the 28° room using the first-in, first-out method. Each production line requires two pack-out personnel who lift and place each container or crate (weighing between 25 and 125 lbs.) on the conveyor which moves the product down line. Thereafter, approximately three to seven pack-out personnel remove the product from the containers or crates and place it in shipping boxes for transport to the shipping trucks.

This method requires the constant rotation of pack-out personnel lifting the containers on the conveyor with cycle time subject to the stamina variation of the personnel doing the lifting. The heavy lifting combined with the fast-paced nature of the work creates high employee turnover rates. Productivity may decrease as the personnel retrieving the product from the containers are not working in unison, which leaves the burden of insuring that all product has been removed from each container on the last worker who must stop the conveyor to complete the removal of the remaining product in the containers. This disrupts activity further up the line. Usually, such starting and stopping occurs at frequent unpredictable intervals during operation.

Also, in other industries personnel are required to lift each item, crate or container from a stack (pallet) and manually place each crate one at a time on a conveyor or table for further processing. Such conventional manual item, crate or container destacking or depalletizing is time consuming and requires personnel to do heavy lifting.

Smith (U.S. Pat. No. 3,904,024) discloses an apparatus for assisting in the manual transferring of objects to or from a plurality of stacks of objects. The apparatus includes an elongate belt conveyor having means for moving the belt in either direction. The belt conveyor is pivotally supported at a first end about a vertical axis so that a second end can be moved in a horizontal, arcuate path from one stack of objects to another. The belt conveyor is also pivotally supported at the first end about a horizontal axis so that the second end can be moved in a vertical, arcuate path between a lower position in which the second end is located near the bottom of the stack and an upper position in which the second end is located near the top of the stack. A hydraulic lift is used to move the second end of the conveyor vertically. In the operation of the apparatus, objects are removed from stacks by having an operator stand on a platform of the hydraulic lift to one side of the second end of the conveyor. The operator has access to a control panel located along the side of the conveyor which enables the operator to control which direction the belt of the conveyor is driven and also to raise and lower the platform to place the second end of the conveyor adjacent the upper most layer of objects. The operator then manually transfers the objects from the uppermost layer onto the belt of the conveyor. When the stack is gone, the operator manually pushes the conveyor to the second stack and then manipulates the lift to move the conveyor back to the uppermost position and then manually starts removing objects from the second stack. When objects are to be moved onto the pallets (stacked), the above procedure is reversed.

Cornacchia (U.S. Pat. No. 5,108,255) discloses a palletizer and depalletizer having a pivotal clamp head and four pickup or deposit positions.

H. Grasvoll (U.S. Pat. No. 3,401,811) discloses a device for unloading pieces of goods from a pallet and transferring the goods to a conveyor. The device includes a lifting carriage adapted to lift and tilt a fully loaded pallet in a stepwise fashion to unload the pallet.

Rydell (U.S. Pat. No. 4,279,555) discloses a machine for stacking panels (palletizing) including an input conveyor for receiving the panels, an elevator conveyor pivotally connected to the discharge end of the input conveyor, a discharge conveyor at the outer end of the elevator conveyor, an elevator motor for moving the elevator conveyor about its pivot axis, and a switch on the discharge conveyor for activating the elevator motor as a panel is discharged therefrom to raise the elevator conveyor a selected distance prior to discharge of the next panel. The machine also includes a mechanism for controlling the length of the elevator conveyor to provide for a vertical stack.

McWilliams (U.S. Pat. No. 3,837,510) discloses a method and apparatus for loading bagged mail from a loading dock into a highway vehicle. A mailbag handling conveyor projects cantilever fashion from the forward end of a frame and is raised and lowered at its forward end by a swingably mounted leg that is movable between lowered and upright positions to vary the elevation of the discharging forward end of the conveyor.

Winski (U.S. Pat. No. 5,096,367) discloses a material handling apparatus and method for handling loose stacks of paper in pallets. The apparatus includes depalletizing, distributing and hopper loading apparatus, as well as material handling apparatus for transporting material therebetween.

Salsburg et al. (U.S. Pat. No. 5,487,638) discloses an apparatus and method for loading rolls of web into a chamber.

Hence, there is a need for an improved system and method for automatically destacking or depalletizing items, crates or containers.

SUMMARY OF THE INVENTION

In accordance with the present invention, an automatic depalletizing system and method addresses the problems associated with conventional pack-out activities involved in moving processed chicken in poultry processing plants as well as depalletizing or destacking items, containers or crates in other industries.

In accordance with a two pack-out line configuration of the present invention, the start and stop controls are placed side by side between the loading areas of the two automatic depalletizing conveyors so that one operator can load and run both lines thereby reducing staffing requirements (by up to 75 percent) and reducing disruption caused by stopping of both conveyors.

Personnel removing the packages from the containers or crates are instructed to remove their share of product from each container as it passes by their work station. This is possible because the containers are now moving at a constant speed and consistent distance intervals.

The cycle times for the automatic depalletizing conveyors are adjustable by way of a flow control valve having index marks located at 360° increments on an adjustment knob. This allows for efficient removal of different quantities of packages per container.

The automatic depalletizing system and method of the present invention increases productivity by reducing staffing levels, providing continuous movement of conveyor due to a synchronized removal of product from the containers, and the like.

In accordance with one particular embodiment of the present invention, a ceiling mounted overhead chain-line conveyor with hooks spaced at container length intervals is routed to sweep across the end of the pack-out line conveyor and automatically remove emptied containers therefrom. The ceiling mounted overhead chain-line conveyor transports the empty containers to a common area for cleaning and re-use. This overhead chain-line conveyor reduces staffing levels and frees space near the end of the pack-out area.

In accordance with an exemplary embodiment, the automatic depalletizing system and method of the present invention includes an electronically controlled, automated, lift conveyor having a specialized pick mechanism at its free end, and having a self-contained hydraulic power supply system. This conveyor is designed to sequentially lift pre-stacked crates, containers or items and place them in a single-file on a rotating conveyor automatically (hands free operation or individually controlled) and then transfer the containers to another area of processing or their final destination.

This automatic depalletizing system and method is especially adapted to transfer crates or containers that are vertically stacked on 4-wheel dollies, for ease of transport during processing. Such 4-wheel dollies are a common mode of in-house transportation of products in the food processing industry. Previous to this systems inception, the pack-out personnel were required to lift each crate or container from its stack and manually place each one on a conveyor for further processing. The crates or containers are usually stacked 7 to 8 high (64" to 72") on each dolly. The present system produces reliable cycle times for product movement and relieves personnel of heavy lifting.

In accordance with the present invention, crates, containers, or items are automatically destacked or depalletized by placing the free end of the depalletizing conveyor in its uppermost position, pushing a dolly having a number of crates, containers or items stacked thereon adjacent the free end of the depalletizing conveyor, pressing the cycle start button to activate the depalletizing conveyor and pick mechanism, the pick mechanism retrieves the uppermost crate, container or item and pulls it onto the upper end of the depalletizing conveyor as the conveyor indexes downwardly to a position adjacent the second item from the top of the stack. This sequential removal of the crates, containers or items from the stack continues until the lowermost crate, container or item is removed. When the last crate, container or item has been transferred to the conveyor, a lower limit switch is energized which causes an up solenoid valve to move the free end of the conveyor upwardly until the uppermost ready position has been reached and immediately stops belt rotation. The automatic depalletizing conveyor is now ready to receive the next dolly having items stacked thereon.

By using two or more such automatic depalletizing conveyors, crates, containers or items can consistently be fed to a downstream conveyor or processing station and thereby eliminate the short cycle time required for a system operator to remove the empty dolly and supply a full dolly adjacent the free end of the depalletizing conveyor.

The principal object of the present invention is the provision of an improved automatic depalletizing system and method for sequentially removing crates, containers, or other items from a vertical stack thereof.

Another object of the present invention is the provision of an automatic depalletizing system and method, especially adapted for the automated destacking of a vertical stack of crates or containers in the food processing industry.

A still further object of the present invention is the provision of an automatic depalletizing system and method that is adapted for use in depalletizing vertical stacks of crates or containers in the poultry processing industry.

Yet another object of the present invention is the provision of an automatic depalletizing system, apparatus, or machine including an electronically controlled lift conveyor having a pick mechanism designed to sequentially lift pre-stacked containers and place them in single-file on a rotating belt.

Other objects and further scope of the applicability of the present invention will become apparent from the detailed description to follow, taken in conjunction with the accompanying drawings.

BRIEF DESCRIPTION OF THE DRAWINGS

FIG. 8 is a perspective view illustration of one of the cams of the pick mechanism of FIGS. 5 and 6;

DETAILED DESCRIPTION OF THE PREFERRED EMBODIMENTS

Figure 12:
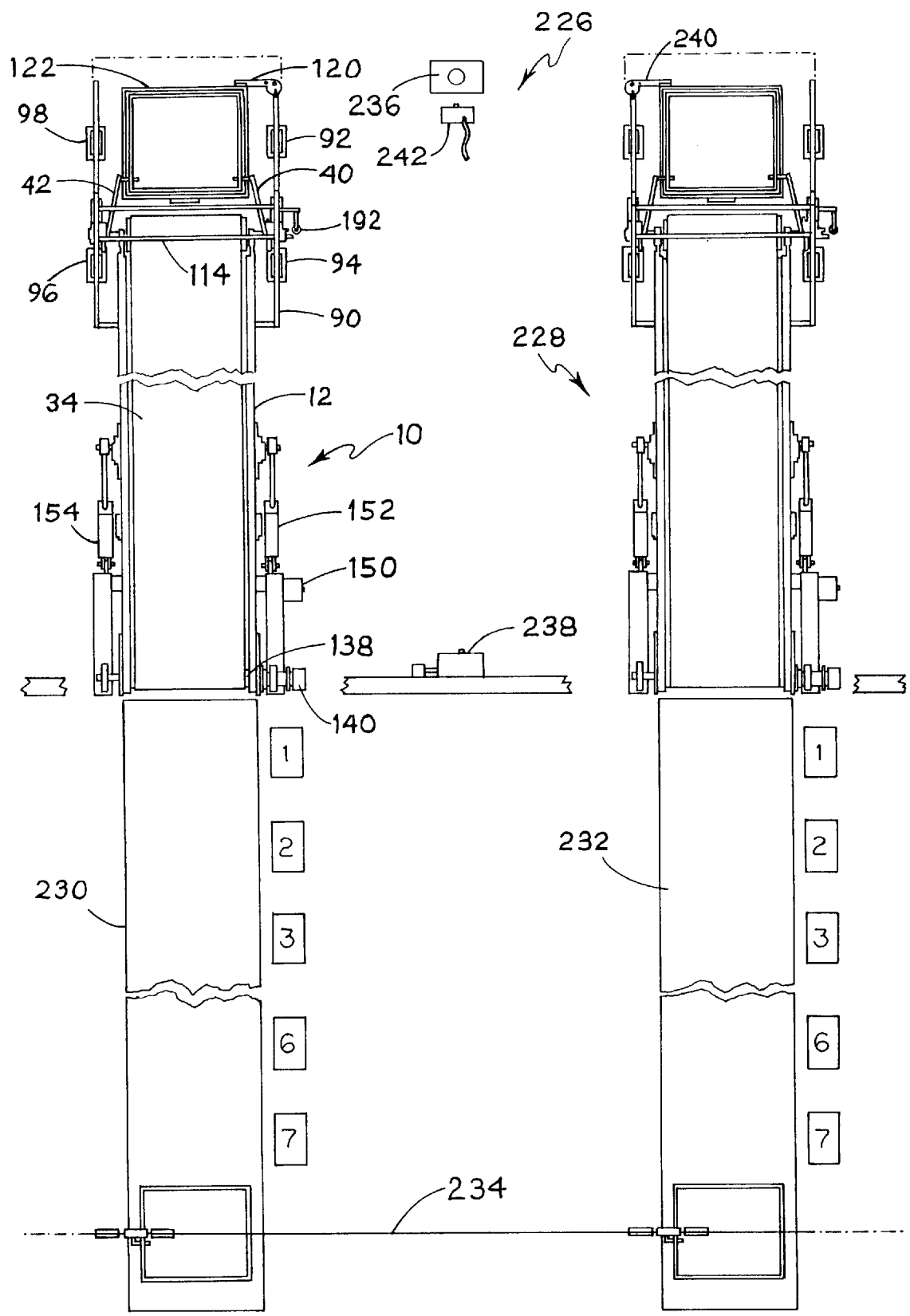
FIG. 12 is a schematic top view representation of a two pack-out line configuration utilizing side by side automatic depalletizing systems for substantially continuously feeding crates or containers from stacks on dollies to a 28° cold room having seven pack-out personnel stations for removing product from the containers and placing the product, for example, in shipping boxes for transport to shipping trucks, and having a ceiling mounted overhead chain-line conveyor (FIG. 11) for removing the emptied containers at the end of the pack-out line.

In accordance with an exemplary embodiment shown in FIGS. 1–10 and 12 of the drawings, an automatic depalletizing system, conveyor, apparatus or machine of the present invention is generally designated by the reference numeral 10 and includes an electronically controlled indexing conveyor 12 having a self-contained hydraulic power supply system 14, and a pick mechanism 16. The pick mechanism 16 is designed to sequentially lift pre-stacked containers 18–32 and place them in single-file on a rotating belt 34 of the conveyor 12 automatically (hands free operation or individually controlled) and then transfer them to another area of processing or their final destination (FIG. 12).

Figure 1:
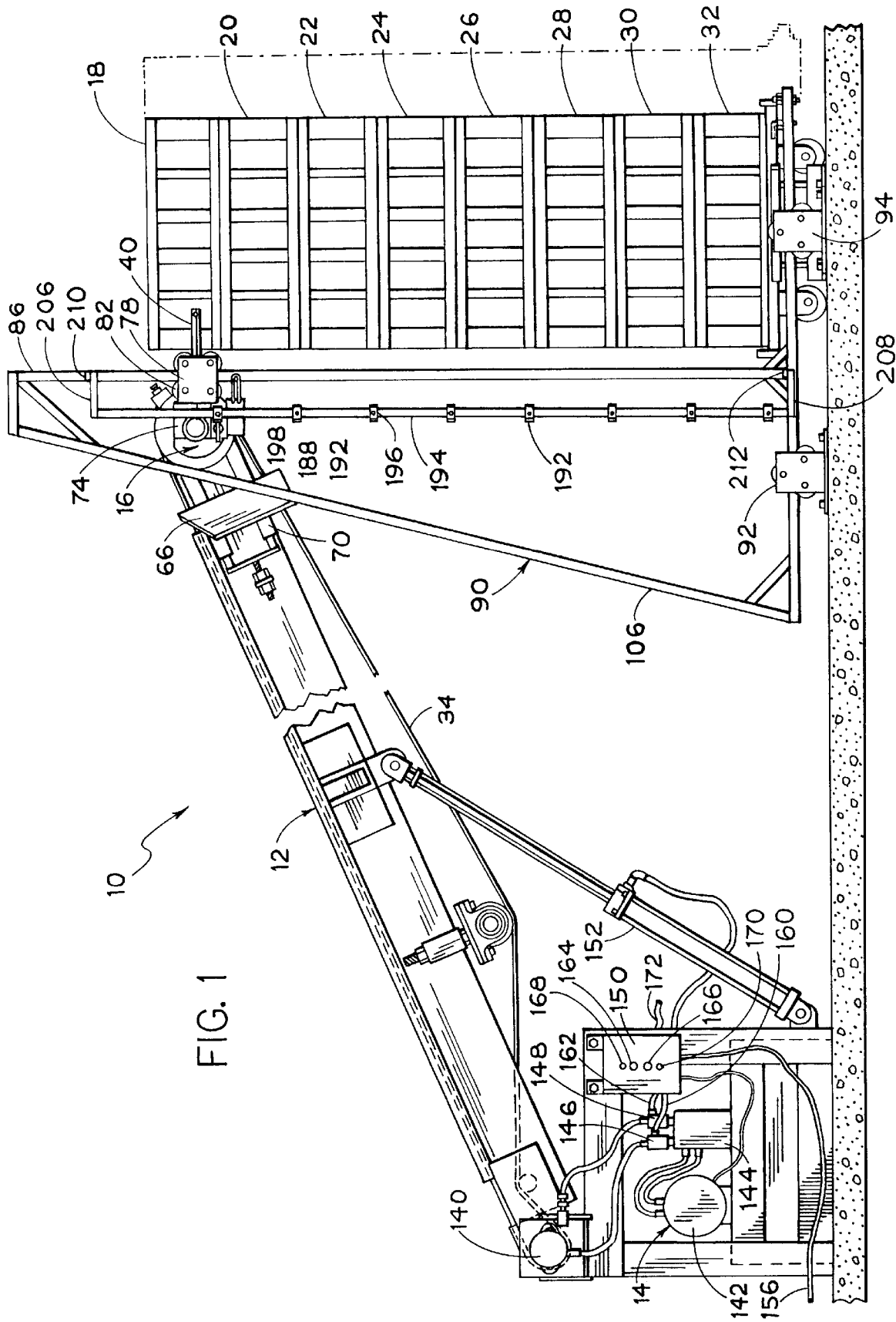
FIG. 1 is a schematic side elevation view illustration of an automatic depalletizing system in accordance with an exemplary embodiment of the present invention with the pick-arms inserted into the uppermost crate on the stack and ready for removal of the uppermost crate.
Figure 2:
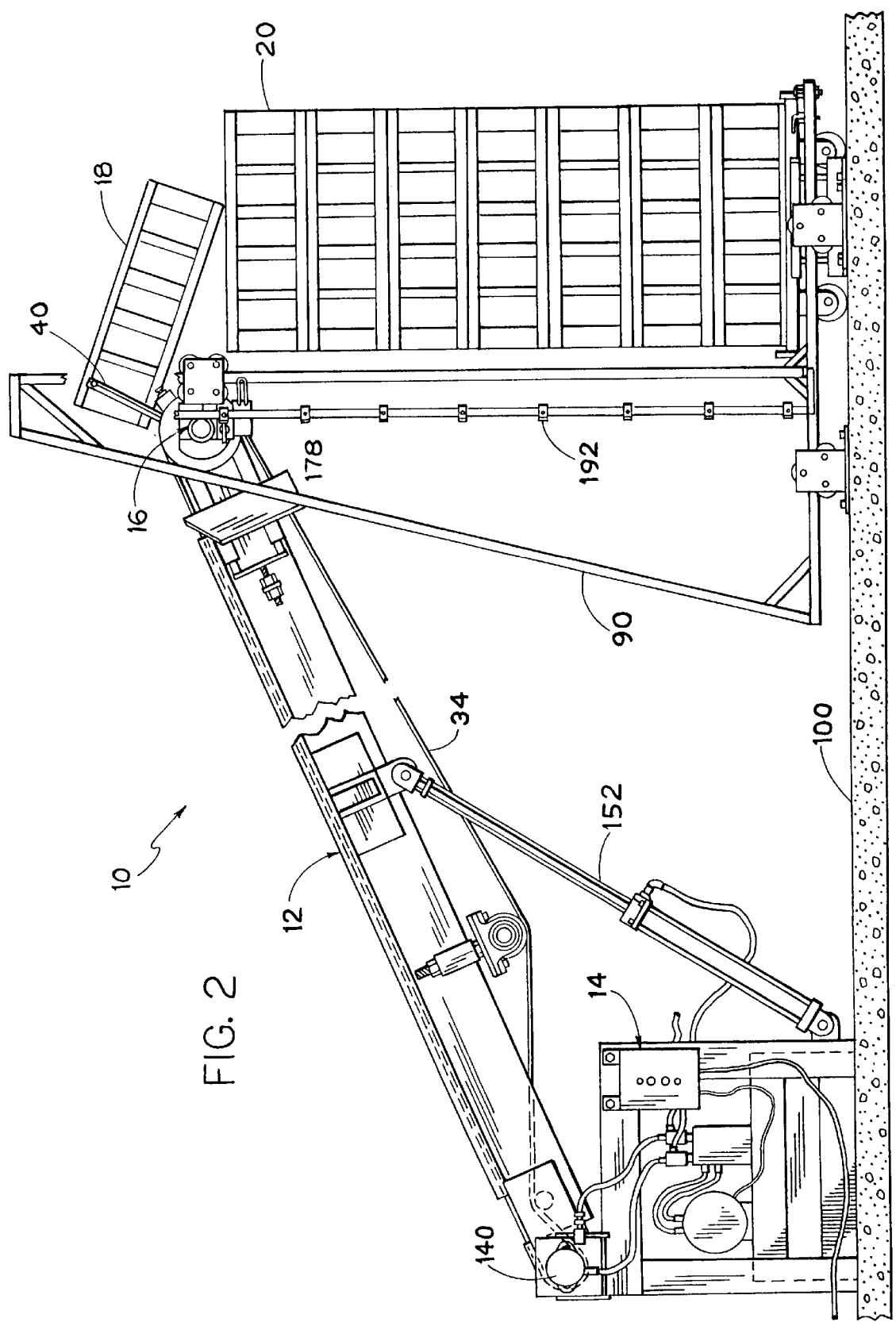
FIG. 2 is a schematic side elevation view representation of the system of FIG. 1 with the top crate partially removed from the stack.
Figure 3:
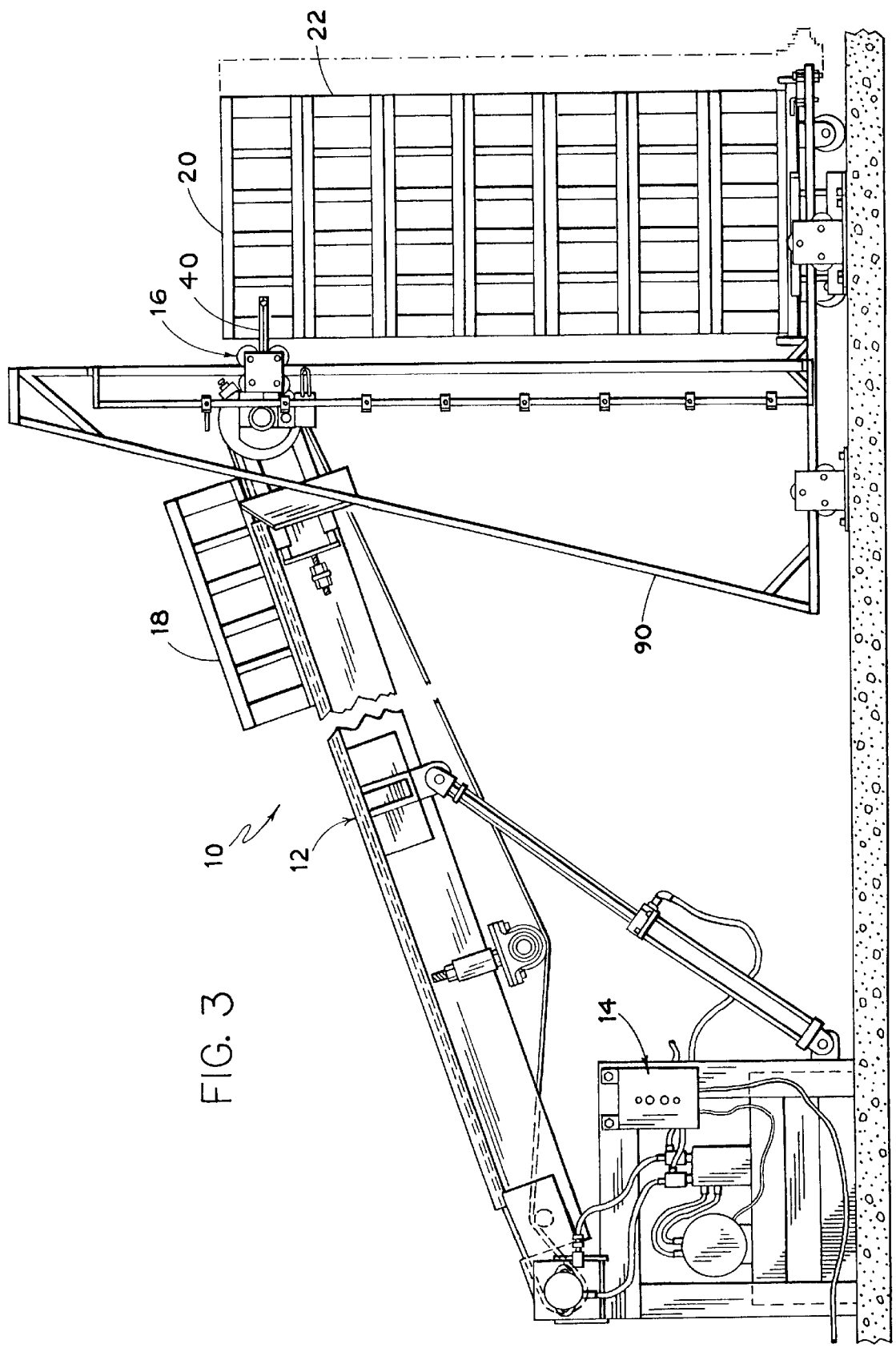
FIG. 3 is a schematic side elevation view representation of the system of FIG. 1 with the uppermost crate located on the belt conveyor and the pick-arms ready for removal of the second crate from the top of the stack.
Figure 4:
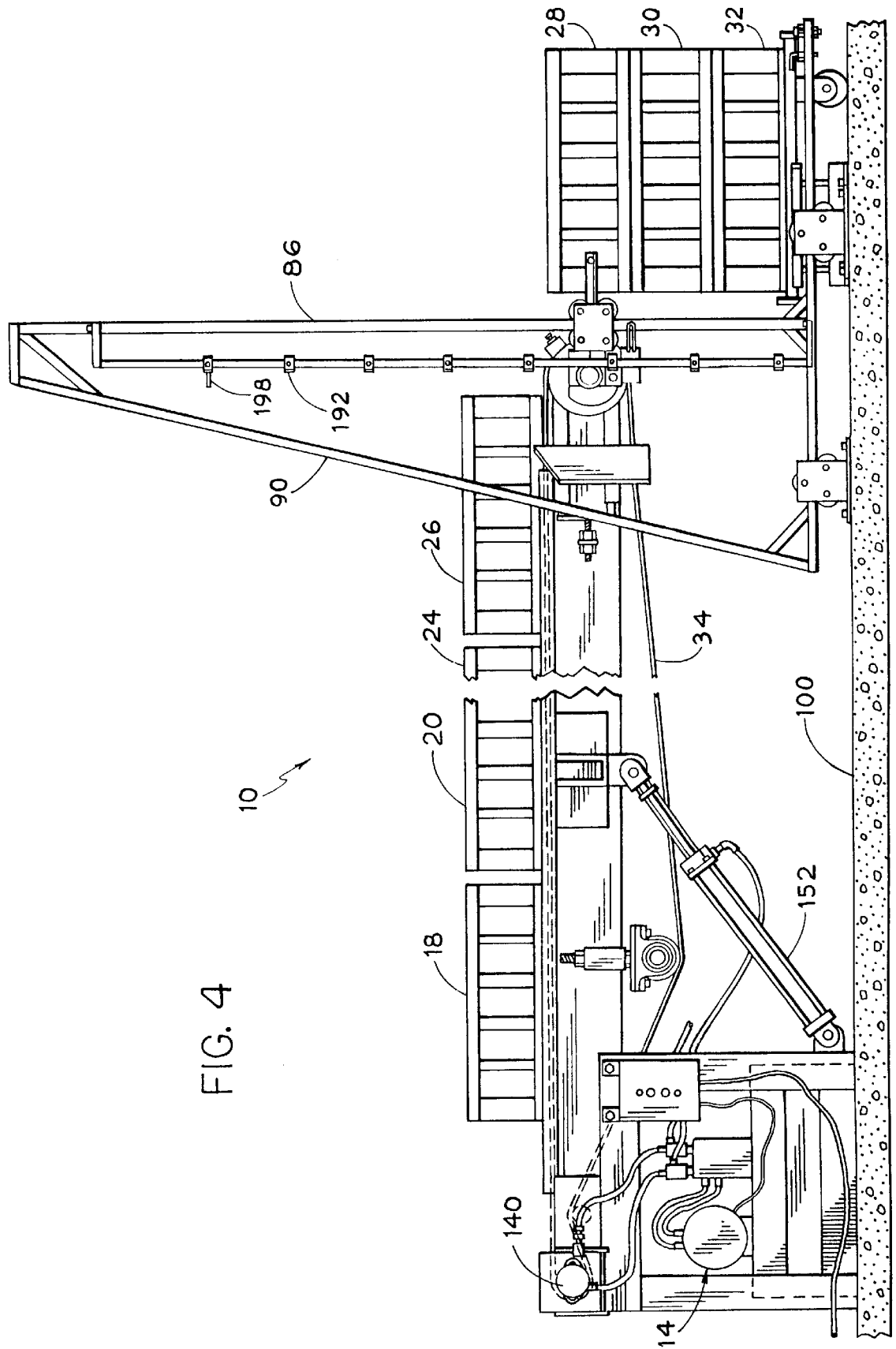
FIG. 4 is a schematic side elevation view illustration of the system of FIG. 1 with the second through fifth crates located on the belt conveyor and the pick-arms ready for removal of the sixth crate from the top of the stack.
Figure 5:
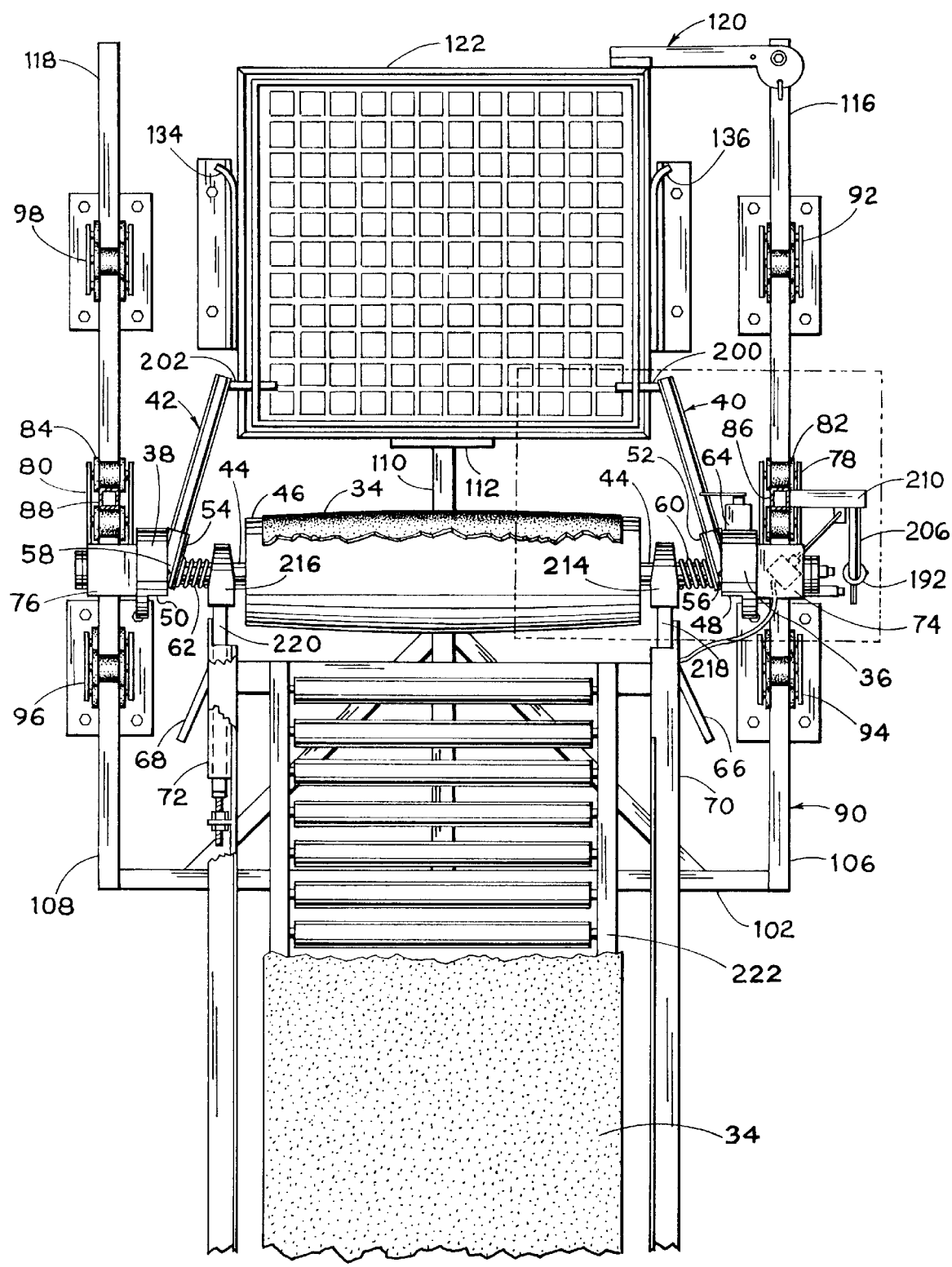
FIG. 5 is a fragmentary top view representation of the free end of the automatic depalletizing system of FIG. 1 with the pick-arms inserted into the uppermost crate on the stack and ready for removal of the uppermost crate (FIG. 1)
Figure 6:
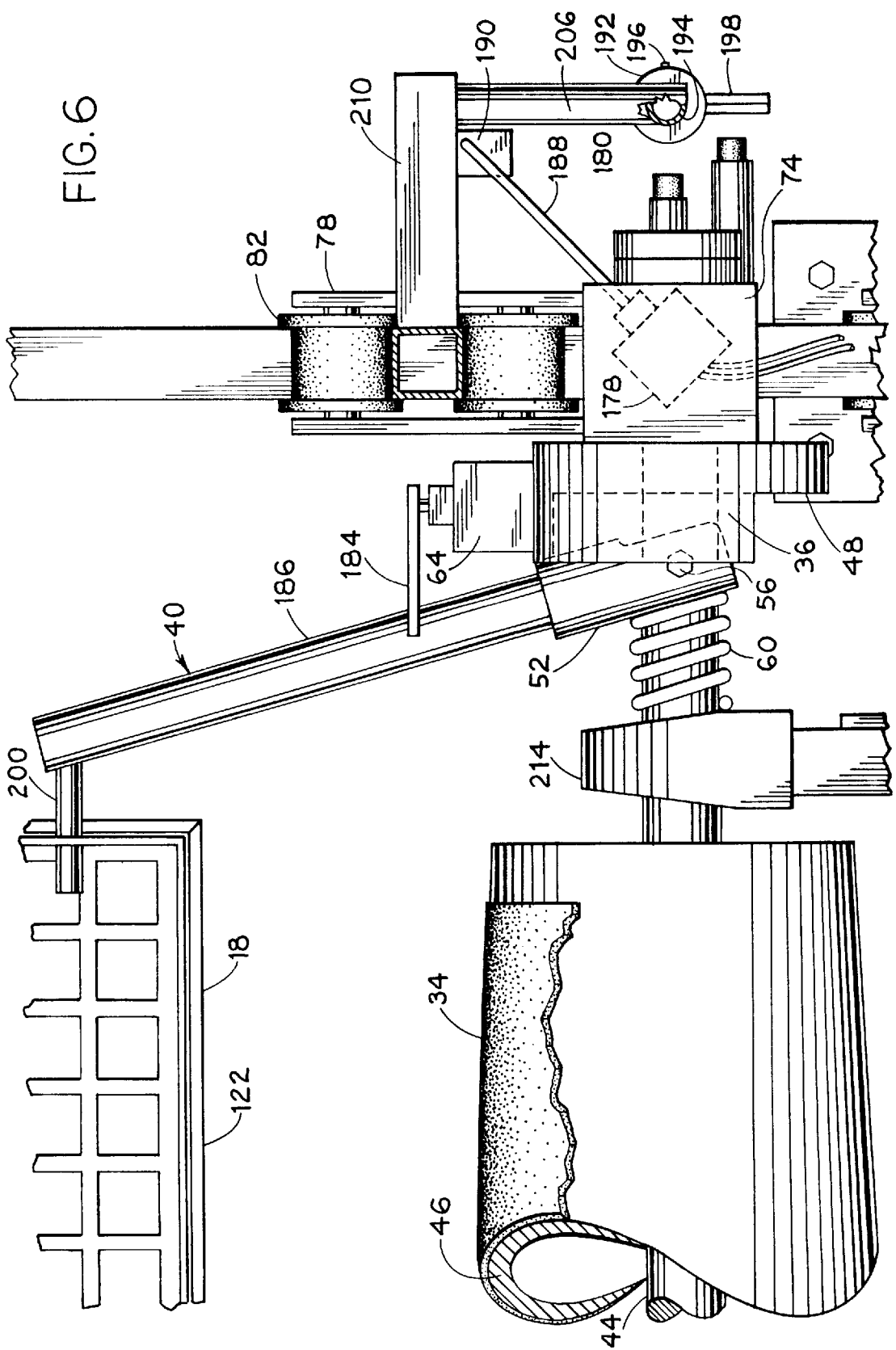
FIG. 6 is an enlarged fragmentary top view illustration of a portion of the pick-arm mechanism of FIG. 5.

The pick mechanism 16 includes cams 36 and 38 which sequentially place two pick-arms 40 and 42 into the containers 18–32 (about ½ inch depth on each side at 0 degree position of FIG. 1). The pick-arms 40 and 42 sequentially lift and transfer the containers 18–32 onto the rotating belt 34 of the indexing conveyor 12. The two pick-arms 40 and 42 pivot relative to a shaft 44 of a front drum 46 of conveyor 12 to allow movement to follow a respective cam profile 48 and 50. A yoke-type bracket 52 and 54 on each pick-arm 40 and 42 is attached to the drum shaft 44 with, for example, a 1 and ½ inch diameter bolt 56 and 58. A compression spring 60 and 62 forces contact of the bracket 52 and 54 against the respective cam profile 48 and 50.

While the pick-arms 40 and 42 are engaged and lifting the first container 18, at approximately 35 degrees (start of engagement is 0 degrees) a first limit switch 64 makes contact with one of the rotating pick-arms 40 signalling downward indexing of the conveyor 12 to begin. By indexing the conveyor 12 down while lifting the container 18, the container moves about only 1 inch up (the pick-arms 40 and 42 rotating the crate 18 upward and then rearward while the indexing conveyor 12 moves down to the next position). Thus, the contents of the container 18 will not fall out the back side because of the incline of the container as the pick-arms rotate and pull the container 18 onto the conveyor 12.

The pick-arms 40 and 42 stay engaged with the container 18 for approximately 120 degrees as the container is being transferred (rotated) onto the belt 34. The pick-arms are then deflected out of each container by the springs 60 and 62 and wipers 66 and 68 mounted on side rails 70 and 72 of the indexing conveyor 12. The profiles 48 and 50 of the cams 36 and 38 are maintained perpendicular (position in relationship to the container) by "floating" the cams 36 and 38 on the shaft 44 of the front drum 46 while the pick-arms 40 and 42 are attached to and rotate with the shaft 44. The cams 36 and 38 ride on respective bronze bushings on the front drum shaft 44. There is a bearing block 74 and 76 bolted to each cam 36 and 38. Each bearing block 74 and 76 has a wheel housing 78 and 80 bolted to it. These wheel housings 78 and 80 include 4 U.H.M.W. grooved wheels 82 and 84 that engage a vertical member 86 and 88 of a triangulated square-tube cage or frame 90 from both sides (each wheel fits on three sides of square tube). By doing so, the cam profiles 48 and 50 are always perpendicular to the container 18–32 that is going to be removed. This position of the cams must be maintained on each of the indexing positions regardless of the angularity of the indexing conveyor 12. The vertical members 86 and 88 of the triangulated square tube cage 90 keep the cams 36 and 38 at 0° position for all containers.

The square tube cage 90 moves on the "X" axis (front to back) and is positioned by four U.H.M.W. wheel housings 92, 94, 96, 98 each having 3 grooved wheels and being bolted to the floor 100 and the two U.H.M.W. wheel housings 78 and 80 that are bolted to the bearing blocks bolted to the cams. This allows the cage 90 to move forward while the indexing downward of conveyor 12 takes place. Two horizontal cross members 102 and 104 are welded in-between two sides 106 and 108 of the triangulated square tube cage 90, one at the bottom rear, one at the top front. On the bottom cross-member 102 a pusher bar 110 is welded in the middle. The pusher bar 110 has a front plate 112 that abuts with and pushes dolly 122 the containers ride in or on. As the downward indexing occurs, the indexing conveyor drum 46 moves forward as it indexes down (follows radial path) to the horizontal position shown in FIG. 4. The conveyor drum 46 moves backward as the conveyor indexes down below the position shown in FIG. 4 to reach the last two containers 30 and 32. The pusher bar and plate 110 and 112 keeps the containers at the same distance relative to the front of the conveyor in all indexing sequences. This should occur to allow the pick-arms 40 and 42 to engage the same point on every container 18–32.

Figure 7:
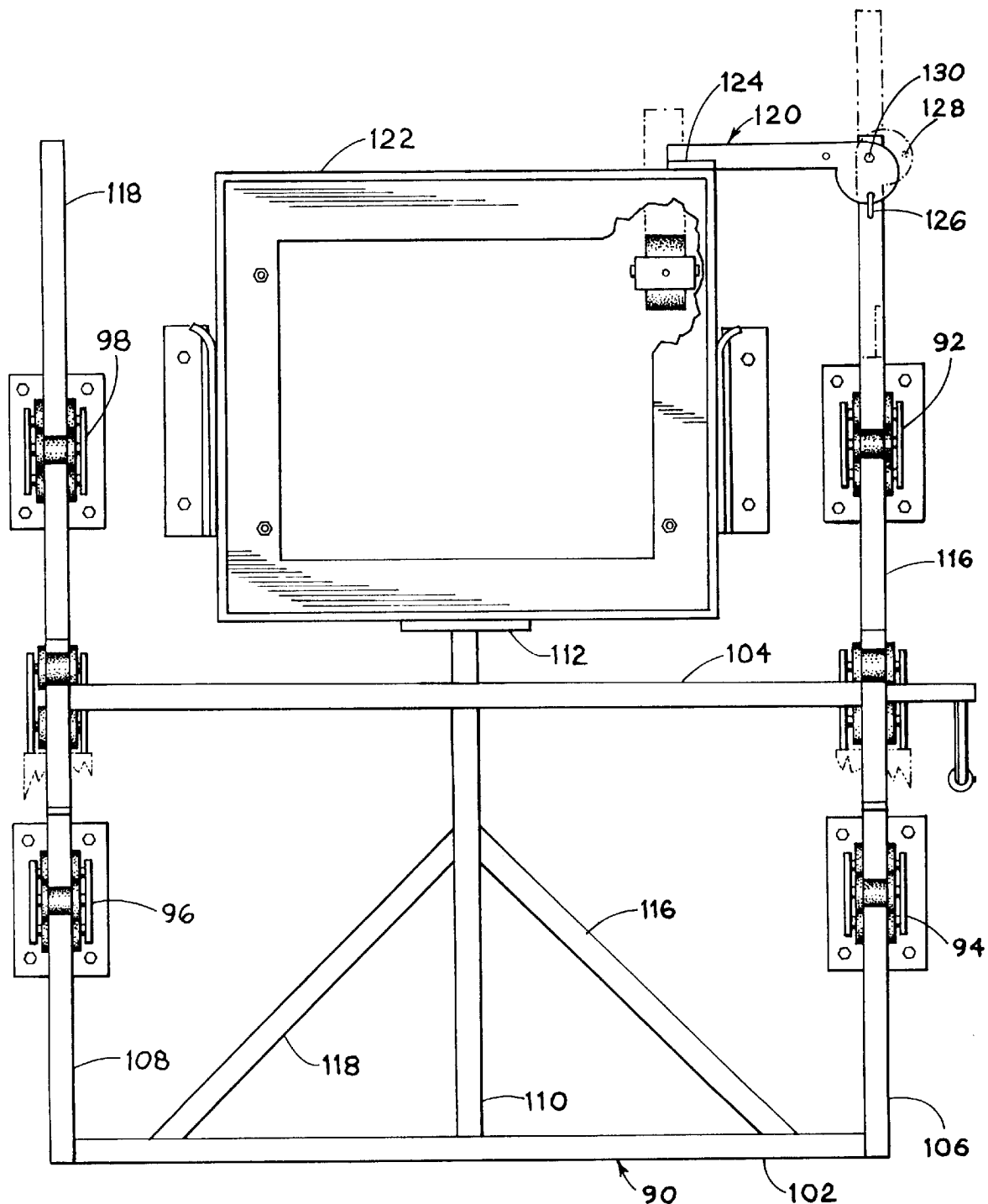
FIG. 7 is a schematic top view representation of the triangulated frame and an empty dolly with the frame and dolly shown in abutting relationship as in FIGS. 1–5 (the conveyor and pick mechanism have been removed for clarity)

With reference to FIG. 12 of the drawings, a second cross member 114 may be added connecting the sides 106 and 108 of triangulated frame 90 as long as it does not interfere with the movement of the uppermost crate or container. With reference to FIG. 7 of the drawings, diagonal support members 116 and 118 further support pusher bar 110 and push plate 112.

With reference again to FIGS. 1–5, 7 and 12 of the drawings, the sides 106 and 108 of triangulated frame or cage 90 have members 116 and 118 which extend outwardly a sufficient distance to allow the sides 106 and 108 to ride in the floor mounted wheel housings 92 and 98 during movement of the cage 90 and also extend a sufficient distance to allow the addition of a catch or lock assembly 120 for temporarily locking a dolly in position with the forward surface of the dolly 122 abutting push plate 112 and the rearward surface abutting a riser 124 of catch assembly 120. The catch assembly 120 includes a removable locking pin 126 which is received through an opening 128 in the catch 120 and a corresponding opening in member 116. Once the dolly has been emptied, the pin 126 is removed by a system operator, the catch 120 is moved out of an obstructing position with respect to the dolly 122, a fully loaded dolly is placed in position against push plate 112, the riser 124 is brought into contact with the rear surface of the new dolly, and pin 126 is placed back into the corresponding openings to lock the catch in position. With respect to FIG. 12 of the drawings, it is noted that the catch assembly 120 may be rotatably attached to either member 116 or 118 of sides 106 or 108 of cage 90 by a bolt 130 passing through the catch 120 and frame member 116.

There are two guides 134 and 136 mounted to the floor 100 for correctly positioning the dolly 122. The system operator pushes the dolly 122 that has the pre-stacked containers thereon into the floor mounted guides 134 and 136, and the dolly is placed against the pusher plate 112 (refer to sequence of operation for cycle start).

The belt 34 is driven by, for example, a 5-inch diameter crowned and knurled rear drum 138 coupled to a hydraulic drive motor 140 (5:1 reduction with flow control valve for speed control). The front drum 46 is, for example, an 8-inch diameter crowned and knurled idler drum. This allows sufficient friction to pick up to 125 pounds.

The free floating cams 36 and 38 are one of the features which make this design unique, by maintaining 0° pick-arm position at all conveyor angles. Hard mounting of the cams to the drum shaft would change the aspect of the indexing conveyor in relationship to cam position, making it impossible to design a cam profile to pick containers from the dolly.

With reference to FIGS. 1–4 of the drawings, the self-contained hydraulic power supply system or unit 14 includes a hydraulic pump 142, a fluid reservoir 144, valves 146 and 148, a control panel 150, and hydraulic cylinders or rams 152 and 154. The hydraulic unit 14 receives incoming power such as 120 volts AC along a line 156 providing power to control panel 150 which in turn selectively provides power to hydraulic pump 142 along a line 158 and power to valves 146 and 148 along lines 160 and 162 respectively. Control panel 150 also has on and off buttons 164 and 166 and corresponding on and off light indicators 168 and 170. Control panel 150 receives input signals along a line 172 from the pick mechanism sensors and switches which control the upward and downward movement of the free end of the conveyor as well as rotation of the hydraulic motor 140 and belt 34.

With reference again to FIGS. 1–6 of the drawings, the pick mechanism 16 includes the index down limit switch 64, down movement limit switch 178, an index down proximity sensor 180, and a return stop proximity sensor 182. Limit switch 64 has a lever arm 184 which is activated by upward movement and contact of elongate shaft 186 of pick-arm 40. Limit switch 178 has a curved wire lever arm 188 which contacts a horizontal plate or tab 190 when the conveyor reaches its lowermost position.

The index down proximity sensor 180 is adapted to sense pick point or index position elements, collars or rings 192 positioned along a vertical rod, pipe or tube 194 by set screws 196. The proximity sensor 180 senses the metal ring 192 and signals the hydraulic unit 14 to stop downward movement of the conveyor 12.

The return stop proximity sensor 182 senses a horizontal extension or flange 198 extending rearwardly from the uppermost pick point collar or ring 192. Hence, upward and downward movement of the conveyor is automatically controlled by the limit switches 64 and 178 and proximity sensors 180 and 182 when the depalletizing system is in operation.

The pick-arms 40 and 42 include short stubs or shafts 200 and 202 adapted to be inserted into openings in the sides of the crate or containers 18-32. It is contemplated that the shafts or studs 200 and 202 could be replaced with spikes, plates, pads, plates with spikes, plates with pads, or the like adapted to frictionally engage the sides of crates, containers, cartons, boxes, or the like.

Although the pick point or index positioning collars or rings 192 are positioned on the vertical shaft 194 which is itself attached to the right side 106 of cage 90, it is to be understood that all of the limit switches and proximity sensors may be added to the left side of the pick mechanism 16 and the pick point or index position elements 192 positioned along a vertical shaft attached to the left side 108 of cage 90. In accordance with the exemplary embodiment shown in the drawings, the shaft 194 is fixed in position relative to the side 106 of cage 90 by being attached to upper and lower rearward shaft extensions 206 and 208 which are attached to the ends of sidewardly extending frame members 210 and 212.

The shaft 44 of front drum 46 is rotatably journalled in pillow blocks or bearings 214 and 216 attached to the ends of pillow block or bearing adjustment brackets 218 and 220 which provide for extension or retraction of the shaft 44 and front drum 46 with respect to the conveyor bed 222.

Figure 9:
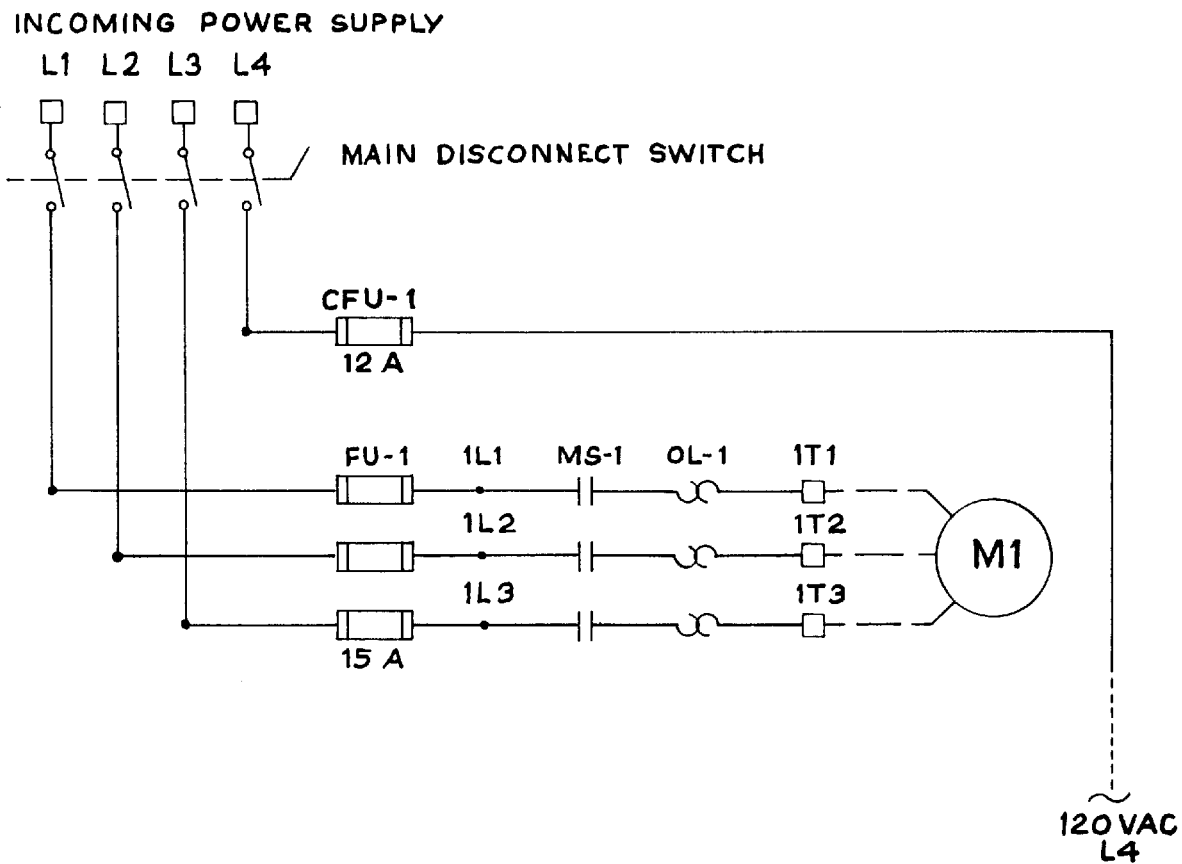
FIG. 9 is a schematic circuit diagram illustration of the power supply circuit diagram of the automatic depalletizing control system.
Figure 10:
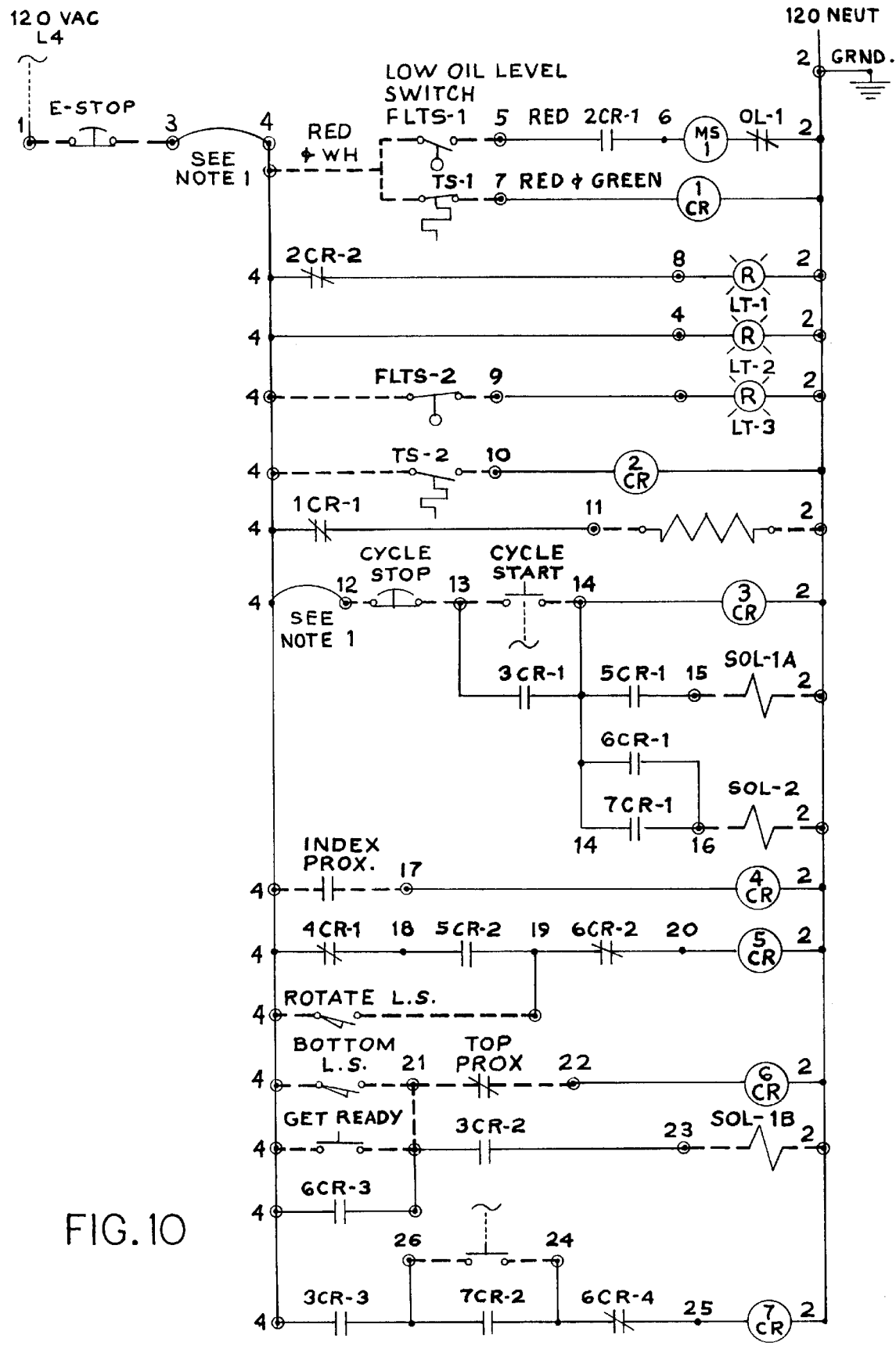
FIG. 10 is a schematic circuit diagram representation of the remainder of the automatic depalletizing control system.

With reference to the exemplary control circuit shown in FIGS. 9 and 10 of the drawings, please note the following:

1. Both wire jumpers have been added in case any additional E-stops or cycle stops are needed.
2. Sequence of operations:
   2.1 When power is on, the "ready" position is with the conveyor stopped and in its uppermost index position.
   2.2 To go to this position, turn on the hydraulic pump, pull out the E-stop button, press the start button, and then press the get-ready button.
   2.3 Any time the stop button is pressed during the sequence of operations, all conveyor motion will cease. It will re-start and continue when the start button is pressed.
   2.4 From the ready position, a cycle is started when the operator presses the start button. The conveyor will begin moving forward and continue moving (except when interrupted) until step 2.7 below.
   2.5 When the pick-arm on the conveyor shaft trips the rotate limit switch (ROTATE L.S.) 64, the conveyor bed will move down to its next index position, as sensed by the index proximity sensor (INDEX PROX.) 180.
   2.6 This forward motion with downward indexing with each shaft revolution continues until the conveyor bed reaches its lowest position.
   2.7 In the lowest position, a tab trips the lever of the bottom limit switch (BOTTOM L.S.) 178, which stops the conveyor motion and energizes the up solenoid valve to return the conveyor bed to the ready position.
3. Replacement proximity sensors must be of the same contact type and rating as the original ones.
4. Incoming power must be protected by a fuse rated for a maximum of 10-amps.
5. The contact for TS-1 opens when the oil temperature is above 68° F.
6. The contact for FLTS-1 opens when the oil level is too low to run the hydraulic pump.
7. The contact for TS-2 closes when the oil temperature is above 41° F.

8. The contact for FLTS-2 closes when the oil level is getting too low.
9. There is one combination temperature and level sensor, one temperature sensor, and one level sensor. The combination sensor (TL008-7) consists of TS1 and FLTS-1. TS-2 is a temperature sensor, while FLTS-2 is a level sensor.

In accordance with another example of the present invention, a sequence of operation is as follows:
1. The cycle starts when the emergency stop button is pulled out, and the cycle start button is pressed (FIG. 1).
   1.1 To get to this point, pull out emergency stop button, press cycle start button, press get ready button (this raises conveyor to its uppermost position and stops belt rotation, FIG. 1).
   1.2 Once cycle start button is pressed, rotation of the belt begins (belt is driven by hydraulic drive motor).
   1.3 The belt then rotates the front drum with the pick-arms mounted to the shaft of the front drum (FIG. 2).
   1.4 The pick-arms are mechanically cammed in for approximately 120° (the crates are perpendicular to the cams at all indexing points) which while at the dwell of the cams they transfer the crate to the conveyor and disengage the crate once 45 percent of the crate has been transferred.
   1.5 When pick-arms are engaged in the crate, one of the pick-arms trips and/or physically engages limit switch 64 which energizes the down solenoid valve and begins lowering the conveyor to the next index position.
2. With the down solenoid valve engaged, the next position is sensed with a magnetic-type proximity sensor 180 which puts directional control valve to neutral. Sequences 1.2 through 1.5 are repeated until last crate has been transferred to the conveyor (FIGS. 1–4).
   2.1 The stop button ceases all motion and maintains position until start button is pressed again.
3. When last crate has transferred to the conveyor, limit switch 178 energizes the up solenoid valve which moves conveyor upward until the ready position has been reached, and immediately stops belt rotation.
4. The ready position is sensed by magnetic proximity sensor 182 which puts the direction control valve to the neutral position.
5. The automatic depalletizing apparatus is now at the start position.

Table I is an exemplary parts list for an automatic depalletizing system in accordance with the present invention.

The automatic depalletizing system and method of the present invention can sequentially lift and transfer a variety of different stacked containers, crates, trays, etc. In accordance with one example, each crate is about 29 inches wide, 26 inches long and 8 inches high.

It is contemplated that the exemplary system 10 of the present invention can be modified as follows.

| Modifications: | Replaces: |
| --- | --- |
| programmable logic controller - | control relays |
| photo eye sensors - | proximity sensors |
| limit switches - | proximity sensors |
| hydraulic or pneumatic bellows/ | cams |

| Modifications: | Replaces: |
| --- | --- |
| double acting cylinder (engages pick-arms) - miter gears and shaft for transferring rotation to front drum & pick-arms - (for heavier loads) | knurled drums |
| scissor-type lift - 6" × 6" plate with ⅛" long spikes - (lifts box) | 2 hydraulic cylinders stubs on pick-arms |

Figure 11:
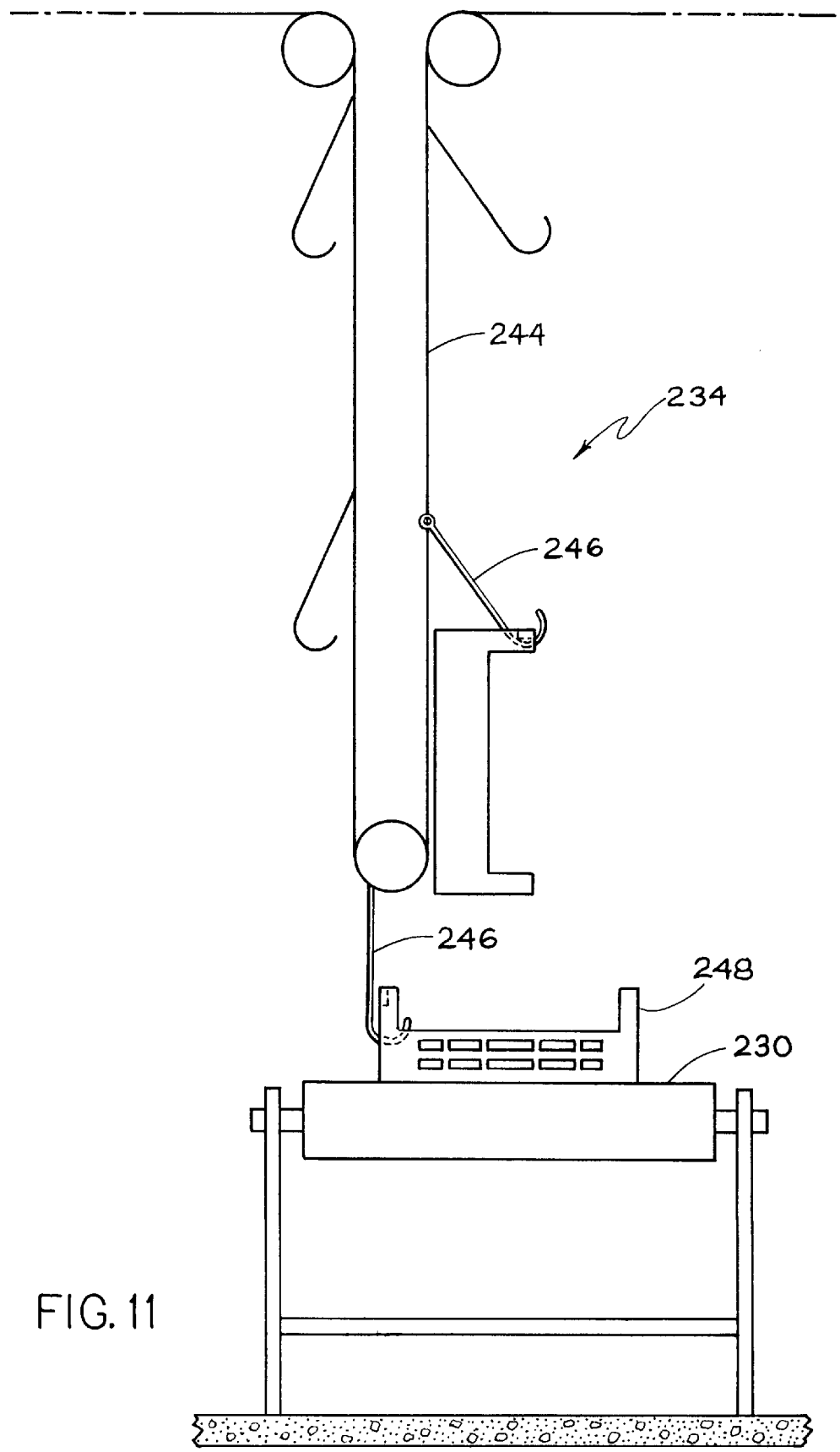
FIG. 11 is a schematic side elevation view illustration of a ceiling mounted overhead chain-line conveyor with hooks spaced at container lengths intervals for removing empty crates or containers from the end of a pack-out line.

With reference to FIGS. 1, 11 and 12 of the drawings and in accordance with another embodiment of the present invention, a two pack-out line is generally designated by the reference numeral 226 and shown to include a first automatic depalletizing system 10, a second automatic depalletizing system 228, a first pack-out line conveyor 230, a second pack-out line conveyor 232, an overhead chain-line conveyor 234, a system operator position 236 between the first and second depalletizing systems, and a wall mounted control panel 238. The pack-out line conveyors 230 and 232 and overhead chain-line conveyor 234 are located in a 28° cold room wherein product is removed from the crates or containers and placed in, for example, shipping boxes for transport to the customer.

The second automatic depalletizing system 228 is substantially identical to the first system 10 with the exception of the location of a dolly catch 240. The system operator supplies the loaded dollies to the depalletizing systems 10 and 228, removes the empty dollies therefrom, and controls the operation of the depalletiziang systems 10 and 228 from a centralized control panel 242 which may hang down from the ceiling to limit obstruction of the work space or from the wall mounted control panel 238. The system operator does not manually load crates or containers from the dollies onto the depalletizing conveyors. This is done automatically by the pick mechanisms which lift and pull the crates or containers sequentially from the loaded dollies.

Should there be a back-up of crates or containers on either of the conveyors 230 or 232, it has been discovered that the pick mechanism can force the crates or containers with a pressure of about 2500 lbs. or less to push the crates or containers downstream. Also, it has been found that the depalletizing system 10 can move crates or containers from the dolly at about 2 to 2½ seconds per crate or container. Given the arrangement of FIG. 12, a single system operator can easily oversee and feed loaded dollies to two automatic depalletizing systems.

With reference again to FIGS. 11 and 12 of the drawings, the ceiling mounted overhead chain-line conveyor 234 has an elongate continuous chain 244 supporting spaced hooks 246 at container length intervals. The chain-line conveyor is routed to sweep across the end of the pack-out line conveyors 230 and 232 for automatic removal of emptied crates or containers. Each of the hooks 246 is adapted to engage an empty container 248 and transport the emptied container to a common area for cleaning and re-use. This overhead conveyor 234 not only reduces staffing requirements, but also frees up space in this area of the pack-out lines.

As shown in FIG. 12 of the drawings, each of the pack-out line conveyors 230 and 232 is adapted to be serviced by up to seven pack-out personnel for removing product from the crates or containers which pass along the conveyor. Although each of the automatic depalletizing systems 10 and 228 are shown feeding a single pack-out line conveyor, it is contemplated that a single automatic depalletizing system 10 may be used to feed a number of pack-out line conveyors by inserting a switching conveyor or switching station between the depalletizing system and pack-out line conveyors.

Thus, it will be appreciated that as a result of the present invention, a highly effective, improved, automatic depalletizing system and method is provided by which the principal objective, among others is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only and not limiting.

SEQUENCE LISTING

Not Applicable.

an electronically controlled, automated, lift conveyor having a first end fixed in position and a second end being movable through an arc with a rotation axis defined by the first end, a self-contained hydraulic unit for raising and lowering the second end of the conveyor and for driving the conveyor, a pick mechanism attached to the second end of the conveyor and having pick-arms which are sequentially brought into contact with and pull each of the stacked items from the stack, and a translating frame having at least one vertical member for guiding the pick mechanism relative to the stacked items so that the pick-arms are brought into contact with a same region on each of the items in the stack and a pusher element for positioning the stack of items at a fixed position with respect to the vertical member, and an automatic control circuit for controlling the automatic depalletizing or destacking system during operation.

TABLE I

| QUANTITY | DESCRIPTION | MANUFACTURE | PART # |
| --- | --- | --- | --- |
| 1 | HYD. POWER UNIT | DIXIE BEARING | V8-075T-15V-P-EP |
| 1 | TEMP. LEVEL SENSOR | APPROVED PURIFICATION CORP. | TL009-041F |
| 1 | PROXIMITY SENSOR "INDEXING DOWN" | TURCK | Ni10-G18-AZ3X-B3331 |
| 1 | PROXIMITY SENSOR "TRAVEL UP STOP" | TURCK | Ni1C-G18-RZ3X-B3331 |
| 1 | DISC SWITCH 600V/3P/30A | ABB | OETL-NF30 |
| 1 | HANDLE & SHAFT KIT | ABB | OETL-ZX102 |
| 1 | CONTACTOR 7½ Hp. | AB | 100-A12ND3 |
| 1 | AUX. CONTACT | AB | 195FA2O |
| 1 | OVERLOAD RELAY | AB | 193-BSC15 |
| 1 | RED INDICATOR LIGHT | AB | 800T-P16R |
| 2 | CONTROL RELAY | AB | 700F-220A1 |
| 1 | CONTROL RELAY | AB | 700F-301A1 |
| 2 | LIMIT SWITCH | AB | 802-AP |
| 1 | PUSH BUTTON | AB | 800T-A1A2 |
| 1 | CONTACT BLOCK | AB | 800T-XD2 |
| 1 | RUBBER BOOT | AB | 800H-N5B |
| 1 | PUSH PULL OPERATOR | AB | 800TFX8D4 |
| 1 | STAINLESS STEEL ENCLOSURE | HOFFMAN | A16H1S06SSLP |
| 1 | STAINLESS STEEL PB ENCLOSURE | AB | 800H-2HZ4 |
| 1 | TRANSFORMER 480–120V 250VA | HAMMOND | MT250MQMJ |
| 1 | FUSE BLOCK 600V/2P/30A MIDGET | HAMMOND | PFK2 |
| 1 | FUSE CLIP KIT | HAMMOND | MHFK |
| 2 | FUSE 600V/1A MIDGET | LITTLE FUSE | CCMR1 |
| 1 | FUSE 600V/2.5A MIDGET | LITTLE FUSE | CCMR2.5 |
| 2 | WIREWAY 1X3 | TITON | SL1X3 |
| 2 | WIREWAY COVER 1" | TITON | TC1 |
| 26 | TERMINAL BLOCKS | ALLTEC | 10012 |
| 3 | TERMINAL BLOCKS | ALLTEC | 10052 |
| 1 | END PLATE | ALLTEC | 20012 |
| 2 | END STOP | ALLTEC | 20052 |
| 56 | WIRE NUMBER INSERT | ALLTEC | 26130 |
| 1 | JUMPER | ALLTEC | 27432 |
| 2 | DIN RAIL | WECO | 63W05200 |
| 28 | FLANGED BRONZE BEARINGS | SYMMCO | SF-1620-4 |
| 4 | FLANGED BEARING BLOCK | SEALMASTER | RFB108 550246 |
| 4 | PILLOW BLOCK | REXNORD | ZA-2108 |
| 2 | CAGE RETAINED NEEDLE ROLLER BEARINGS | TORRINGTON | J-1616 |
| 2 | THRUST NEEDLE ROLLER & CAGE ASSEMBLIES | TORRINGTON | NTA-2435 TRF-2435 |
| 2 | COMPRESSION SPRINGS | MCMASTER CARR CAT. #100 | 96485K154 |
| 1 | GRAVITY ROLLER CONVEYOR | GRAINGER CAT. #386 | 3F10KG03B22 4W577 |
| 1 | 28½" WIDE DIAMOND PATTERN "NATURAL" RUBBER | RUBBER & GASKET | |
| 2 | SLEEVE BEARINGS BRONZE | SYMMCO | SS-4858-32 |
| 2 | DOUBLE ACTING 18 × 2½" HYDRAULIC CYLINDERS | CHIEF | BAILEY CAT. #204 214–117 |
| 24 | SHOULDER SCREWS ½" × 2½" | MCMASTER CARR | 90298A722 CAT #100 |

What is claimed is:

1. An automatic depalletizing or destacking system for sequentially removing from the top of a stack of individual stacked items, crates, containers, boxes, or the like and placing the items in single-file on a conveyor for further processing or movement to their destination, the system comprising:

2. The automatic depalletizing or destacking system as recited in claim 1, wherein said automatic control circuit includes a start button, stop button, bottom level switch, top level sensor, pick point position sensor, and pick-arm rotation switch.

3. The automatic depalletizing or destacking system as recited in claim 1, wherein said pick mechanism includes non-rotating cams with each cam having a cam profile which causes the pick-arms to engage with the stacked items through about 120° of rotation of the pick-arms.

4. The automatic depalletizing or destacking system as recited in claim 1, wherein said pick mechanism includes cams having a cam profile with a raised portion causing the pick-arms to be fully engaged with the stacked items when the pick-arms are substantially horizontal.

5. The automatic depalletizing or destacking system as recited in claim 1, wherein said pick-arms of said pick mechanism are attached to a rotational shaft of an idler drum at the second end of the conveyor.

6. The automatic depalletizing or destacking system as recited in claim 1, wherein said conveyor is a belt conveyor having a drive drum driven by a hydraulic motor at the first end of the conveyor, an idler drum at the second end of the conveyor, a conveyor belt passing around the drive and idler drums and resting on top of a conveyor bed, wherein said belt causes the idler drum to rotate and thereby rotates the rotation shaft thereof which causes rotation of the pick-arms.

7. The automatic depalletizing or destacking system as recited in claim 1, wherein said translating frame further includes a lock or catch assembly for temporarily locking the stack of items in position with respect to the pusher element and the vertical member.

8. An automatic depalletizing or destacking method for sequentially removing stacked items from the top of a stack and placing these items in single-file on a conveyor for further processing or movement to a destination, the method comprising the steps of:

placing a free end of a depalletizing conveyor in its uppermost position, placing a dolly having a number of items vertically stacked thereon adjacent the free end of the depalletizing conveyor, starting an automatic depalletizing or destacking cycle, picking the uppermost item from the stack of items and placing it on top of the conveyor using a pick mechanism while the conveyor is indexed downwardly to a position adjacent the next item from the top of the stack, sequentially removing each of the items from the stack until the lowermost item is removed, energizing a lower limit switch which causes the conveyor to move to its uppermost ready position to receive a next dolly having items stacked thereon, and maintaining a selected spacing between the free end of the conveyor and each item in the stack by having the dolly abut with a translating frame having at least one vertical member which guides the pick mechanism with respect to each item in the stack during articulation of the conveyor.

9. The method as recited in claim 8, wherein downward movement of the free end of the conveyor is interrupted upon the sensing of a pick point collar by a pick point proximity sensor, and ceasing interruption of downward movement of the free end of the conveyor following the sensing of rotation of pick-arms of the pick mechanism through a selected angle by a rotation limit switch.

10. The method as recited in claim 8, wherein said translating frame further includes a lock or catch assembly which temporarily locks the dolly in position against a positioning element and wherein said maintaining step includes temporarily locking said dolly in position with respect to said translating frame.

11. An automatic depalletizing or destacking method for sequentially removing stacked items from the top of a stack and placing these items in single-file on a conveyor for further processing or movement to a destination, the method comprising the steps of:

placing a free end of a depalletizing conveyor in its uppermost position, placing a dolly having a number of items vertically stacked thereon adjacent the free end of the depalletizing conveyor, starting an automatic depalletizing or destacking cycle, picking the uppermost item from the stack of items and placing it on top of the conveyor using a pick mechanism having opposing spaced pick-arms which are sequentially brought into contact with and pull each of the stacked items from the stack while the conveyor is indexed downwardly to a position adjacent the next item from the top of the stack, sequentially removing each of the items from the stack until the lowermost item is removed, energizing a lower limit switch which causes the conveyor to move to its uppermost ready position to receive a next dolly having items stacked thereon.

12. An improvement for reducing manual labor in a poultry processing plant, the improvement comprising:

an automatic depalletizing system for automatically depalletizing or destacking containers or crates containing processed poultry therein from a stack of such crates on a wheeled dolly and automatically transferring the destacked crates or containers to a pack-out line said automatic depalletizing system comprising an electronically controlled, automated, lift conveyor having a first end fixed in position and a second end being movable through an arc with a rotation axis defined by the first end, a self-contained hydraulic unit for raising and lowering the second end of the conveyor and for driving the conveyor, a pick mechanism attached to the second end of the conveyor and having pick-arms which are sequentially brought into contact with and pull each of the stacked crates from the stack, and a translating frame having at least one vertical member for guiding the pick mechanism relative to the stacked crates so that the pick-arms are brought into contact with a same region on each of the crates in the stack and a positioning element for positioning the stack of crates at a fixed position with respect to the vertical member, and an automatic control circuit for controlling the automatic depalletizing system during operation.

\* \* \* \* \*